US012638304B2

(12) United States Patent
Tanaka et al.

(10) Patent No.: US 12,638,304 B2
(45) Date of Patent: May 26, 2026

(54) DATA COLLECTION INSTRUCTION DEVICE, METHOD, AND COMPUTER PROGRAM FOR GIVING INSTRUCTIONS TO COLLECT DATA

(71) Applicant: Woven by Toyota, Inc., Tokyo (JP)

(72) Inventors: Masahiro Tanaka, Tokyo-to (JP); Tatsuyoshi Kitamura, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 70 days.

(21) Appl. No.: 18/632,399

(22) Filed: Apr. 11, 2024

(65) Prior Publication Data

US 2024/0377222 A1 Nov. 14, 2024

(30) Foreign Application Priority Data

May 9, 2023 (JP) ................................ 2023-077434

(51) Int. Cl.
*G01C 21/00* (2006.01)
*G07C 5/02* (2006.01)
(52) U.S. Cl.
CPC ........... *G01C 21/3841* (2020.08); *G07C 5/02* (2013.01)
(58) Field of Classification Search
CPC ................ G01C 21/3841; G01C 21/38; G01C 21/3815; G01C 21/3859; G07C 5/02; G01S 13/08; G01S 19/13; G01S 19/42; G06V 10/82
See application file for complete search history.

(56) References Cited

U.S. PATENT DOCUMENTS

| | | | |
|---|---|---|---|
| 2003/0055558 A1* | 3/2003 | Watanabe | .......... G01C 21/3484 |
| | | | 701/457 |
| 2008/0162041 A1 | 7/2008 | Nakamura | |
| 2019/0063929 A1* | 2/2019 | Ohyama | ............ G01C 21/3819 |
| 2020/0359181 A1* | 11/2020 | Kusumoto | .............. H04W 4/44 |
| 2022/0099459 A1 | 3/2022 | Watanabe | |

FOREIGN PATENT DOCUMENTS

| | | | | |
|---|---|---|---|---|
| CN | 111583641 A | * | 8/2020 | .......... G08G 1/0104 |
| CN | 115019507 A | * | 9/2022 | .......... G08G 1/0137 |
| JP | 2008164831 A | | 7/2008 | |
| JP | 4165457 B2 | | 10/2008 | |
| JP | 6543983 B2 | | 7/2019 | |
| WO | 2020250719 A1 | | 12/2020 | |

* cited by examiner

*Primary Examiner* — Erin M Piateski
*Assistant Examiner* — Hajar Hassaniardekani
(74) *Attorney, Agent, or Firm* — Dickinson Wright, PLLC

(57) ABSTRACT

A data collection instruction device includes a memory configured to store travel history of each of a plurality of vehicles; and a processor configured to select one or more vehicles satisfying a predetermined condition related to travel in an update target region of map information from among the plurality of vehicles, based on the travel history of each of the plurality of vehicles, instruct the selected one or more vehicles to collect probe data representing a predetermined feature of the update target region, via a communication device, and instruct the plurality of vehicles except the selected one or more vehicles to collect the probe data of a predetermined road section, via the communication device.

6 Claims, 8 Drawing Sheets

FIG. 6

DATA COLLECTION INSTRUCTION DEVICE, METHOD, AND COMPUTER PROGRAM FOR GIVING INSTRUCTIONS TO COLLECT DATA

FIELD

The present invention relates to a data collection instruction device, a method, and a computer program for giving instructions to collect data to be used for updating a map.

BACKGROUND

High-precision maps to which an autonomous vehicle-driving system refers for autonomous driving control of a vehicle are required to represent information on roads accurately. Thus, data representing features on or around a road in a predetermined region (hereafter "probe data"), which is obtained by a sensor mounted on a vehicle that actually travels in the predetermined region, is collected from the vehicle. In particular, a technique to collect information on a new road has been proposed (see Japanese Unexamined Patent Publication JP2008-164831A).

In a technique disclosed in JP2008-164831A, a vehicle serving as a probe car transmits travel history information on travel on a road that is not included in navigation map data stored in a navigation device to a map distribution center as probe data. The map distribution center, which receives travel history information from navigation devices of vehicles, collects the received data and excludes travel history information that is not assumed to correspond to travel of a vehicle on a new road to narrow down target data.

SUMMARY

In general, traffic volume in a certain period varies from road section to road section. Thus, an insufficient amount of probe data may be collected in some road sections. If the period of collection of probe data or the amount of probe data to be collected is increased so that a sufficient amount of probe data may be collected in any road section, an excessive amount of probe data will be transmitted to a server in some road sections. This will result in communication traffic between vehicles and the server excessively increasing.

It is an object of the present invention to provide a data collection instruction device that can appropriately collect probe data necessary for updating map information while preventing an increase in communication traffic required to collect probe data.

According to an embodiment, a data collection instruction device is provided. The data collection instruction device includes a memory configured to store travel history of each of a plurality of vehicles; and a processor configured to: select one or more vehicles satisfying a predetermined condition related to travel in an update target region of map information from among the plurality of vehicles, based on the travel history of each of the plurality of vehicles, and instruct the selected one or more vehicles to collect probe data representing a predetermined feature of the update target region, via a communication device, and instruct the plurality of vehicles except the selected one or more vehicles to collect the probe data of a predetermined road section, via the communication device.

The processor of the data collection instruction device preferably selects one or more vehicles from among the plurality of vehicles in descending order of travel coverage that is the ratio of road sections actually traveled in a most recent predetermined period to a plurality of road sections included in the update target region, by referring to the travel history of each of the plurality of vehicles.

In this case, an importance level is preferably set for each of the plurality of road sections included in the update target region. For each of the plurality of vehicles, the processor preferably calculates the ratio of the sum of the importance levels of road sections actually traveled by the vehicle in the most recent predetermined period among the plurality of road sections to the sum of the importance levels of the plurality of road sections included in the update target region, as the travel coverage of the vehicle.

The processor of the data collection instruction device preferably selects one or more vehicles from among the plurality of vehicles in descending order of the ratio of time of travel in the update target region in a predetermined time of day or a predetermined day of the week to total travel time in a most recent predetermined period, by referring to the travel history of each of the plurality of vehicles.

According to another embodiment of the present invention, a method for giving instructions to collect data is provided. The method includes selecting one or more vehicles satisfying a predetermined condition related to travel in an update target region of map information from among a plurality of vehicles, based on travel history of each of the plurality of vehicles stored in a memory; instructing the selected one or more vehicles to collect probe data representing a predetermined feature of the update target region, via a communication device; and instructing the plurality of vehicles except the selected one or more vehicles to collect probe data of a predetermined road section, via the communication device.

According to still another embodiment of the present invention, a non-transitory recording medium that stores a computer program for giving instructions to collect data is provided. The computer program includes instructions causing a computer to execute a process including selecting one or more vehicles satisfying a predetermined condition related to travel in an update target region of map information from among a plurality of vehicles, based on travel history of each of the plurality of vehicles stored in a memory; instructing the selected one or more vehicles to collect probe data representing a predetermined feature of the update target region, via a communication device; and instructing the plurality of vehicles except the selected one or more vehicles to collect probe data of a predetermined road section, via the communication device.

The data collection instruction device according to the present disclosure has an advantageous effect of being able to appropriately collect probe data necessary for updating map information while preventing an increase in communication traffic required to collect probe data.

BRIEF DESCRIPTION OF DRAWINGS

FIG. 6 is a functional block diagram of a processor of the server.

DESCRIPTION OF EMBODIMENTS

A data collection instruction device, a method for giving instructions to collect data executed by the data collection instruction device, and a computer program for giving instructions to collect data will now be described with reference to the attached drawings. The data collection instruction device is used for a data collecting system that collects probe data representing a predetermined feature on or around a road from vehicles and that updates map information, based on the collected probe data.

A server that updates map information, based on probe data, detects a location where some change in a predetermined feature has occurred after the last update of the map information (hereafter simply a "change point") in a region that may be a target for update of the map information (hereafter an "update target region"). To determine the presence or absence of such a change point, the only requirement is collecting a relatively small amount of probe data for each road section in the update target region. To detect a change point accurately, it is desirable to execute registration between features represented by collected probe data and corresponding features represented in the map information with sufficient accuracy. To achieve this, it is preferable that, over a section of a certain length, an individual vehicle can generate probe data of multiple features in the section. Regarding a road section having such a change point (hereafter an "update target section"), collecting a relatively large amount of probe data is required to reflect information on a changed feature in the map information accurately.

Thus the data collection instruction device selects one or more vehicles satisfying a predetermined condition related to travel in an update target region from among a plurality of vehicles that can generate and collect probe data, and instructs the selected one or more vehicles to collect probe data of the update target region. Further, the data collection instruction device instructs the plurality of vehicles except the selected one or more vehicles to collect probe data of a limited update target section in the update target region. In this way, probe data of road sections in the update target region is collected by the selected vehicles, which reduces communication traffic required to transmit probe data. In addition, the selected vehicles generate probe data over a continuous section of a certain length, which enables collecting an amount of probe data necessary for detecting a change point while ensuring the accuracy of registration. In addition, other vehicles except the selected vehicles are also instructed to collect probe data of the update target section, which facilitates collection of an amount of probe data necessary for updating information on a change point.

Figure 1:
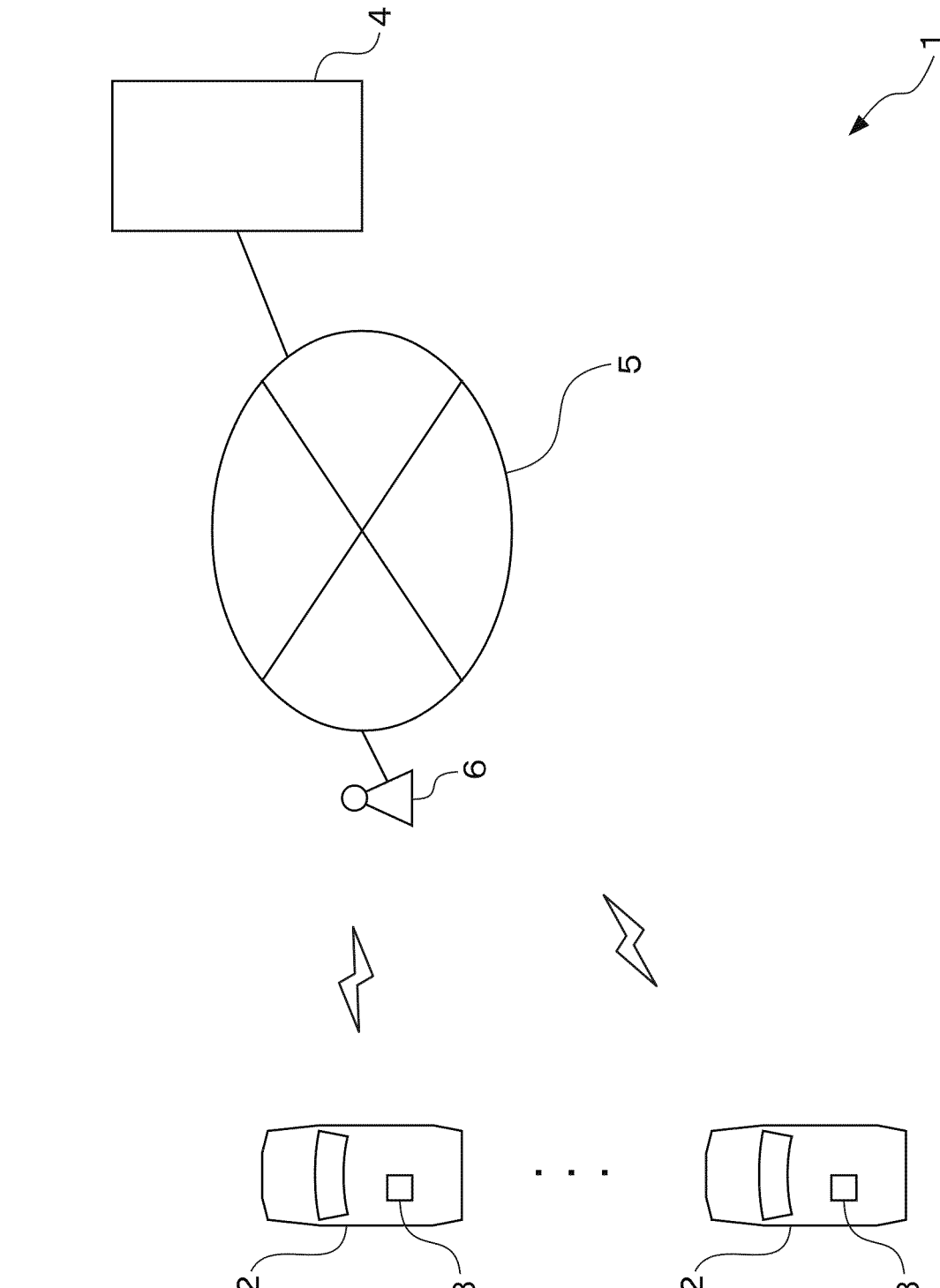
FIG. 1 schematically illustrates the configuration of a data collecting system equipped with a data collection instruction device.

FIG. 1 schematically illustrates the configuration of a data collecting system equipped with the data collection instruction device. In the present embodiment, the data collecting system 1 includes data collecting devices 3 mounted on a plurality of vehicles 2, respectively, and a server 4, which is an example of the data collection instruction device. Each data collecting device 3 accesses a wireless base station 6, which is connected, for example, via a gateway (not illustrated) to a communication network 5 connected with the server 4, thereby connecting to the server 4 via the wireless base station 6 and the communication network 5. For simplicity, FIG. 1 illustrates only a single wireless base station 6, but multiple wireless base stations 6 may be connected to the communication network 5.

First, the vehicles 2 and the data collecting devices 3 will be described. The data collecting system 1 includes multiple vehicles 2 each equipped with a data collecting device 3 as described above, but each vehicle 2 and each data collecting device 3 have the same configuration and execute the same processing in relation to a data collecting process. Thus the following describes a single vehicle 2 and a single data collecting device 3.

Figure 2:
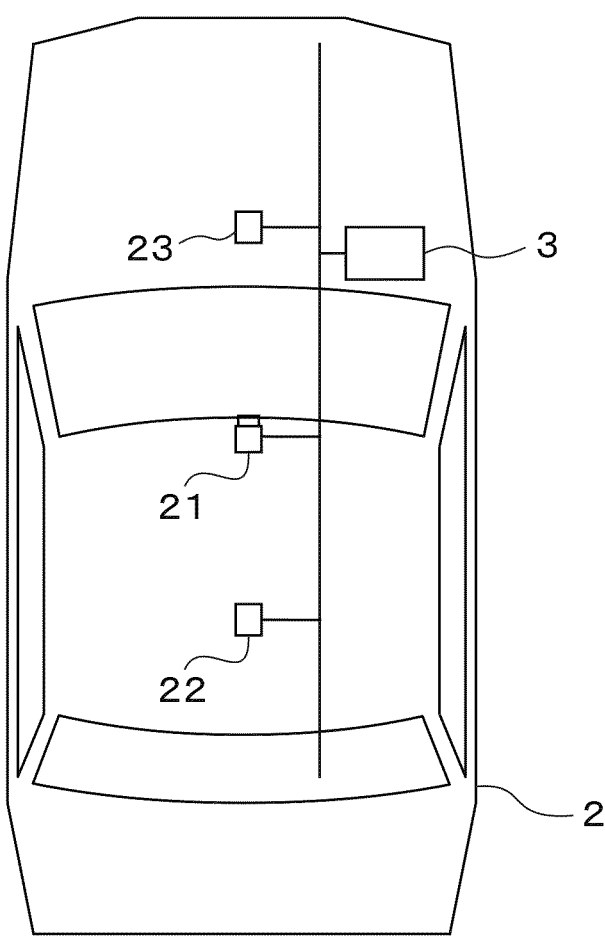
FIG. 2 schematically illustrates the configuration of a vehicle.

FIG. 2 schematically illustrates the configuration of the vehicle 2. The vehicle 2 includes a camera 21 for taking pictures of an area around the vehicle 2, a GPS receiver 22, and a wireless communication terminal 23, in addition to the data collecting device 3. The camera 21, the GPS receiver 22, the wireless communication terminal 23, and the data collecting device 3 are communicably connected via an in-vehicle network conforming to a standard such as a controller area network. The vehicle 2 may further include a range sensor (not illustrated) for measuring the distance to an object in an area around the vehicle 2, such as a LiDAR sensor.

The camera 21, which is an example of an image capturing unit, includes a two-dimensional detector constructed from an array of optoelectronic transducers, such as CCD or C-MOS, having sensitivity to visible light and a focusing optical system that forms an image of a target region on the two-dimensional detector. The camera 21 is mounted, for example, in the interior of the vehicle 2 so as to be oriented, for example, to the front of the vehicle 2. The camera 21 takes pictures of a region in front of the vehicle 2 every predetermined capturing period (e.g., $\frac{1}{30}$ to $\frac{1}{10}$ seconds), and generates images representing the region. The images obtained by the camera 21 may be color or grayscale images. The vehicle 2 may include multiple cameras 21 taking pictures in different orientations or having different focal lengths. Every time an image is generated, the camera 21 outputs the generated image to the data collecting device 3 via the in-vehicle network.

The GPS receiver 22 receives GPS signals from GPS satellites at predetermined intervals, and determines the position of the vehicle 2, based on the received GPS signals. The GPS receiver 22 outputs positioning information indicating the result of determination of the position of the vehicle 2 based on the GPS signals to the data collecting device 3 via the in-vehicle network at predetermined intervals. Instead of the GPS receiver 22, the vehicle 2 may include a receiver conforming to another satellite positioning system. In this case, the receiver determines the position of the vehicle 2.

The wireless communication terminal 23, which is an example of a communication device, is a device to execute a wireless communication process conforming to a predetermined standard of wireless communication, and accesses, for example, the wireless base station 6 to connect to the server 4 via the wireless base station 6 and the communication network 5. In other words, a communication channel is established between the wireless communication terminal 23 and the server 4 via the wireless base station 6 and the communication network 5. The wireless communication terminal 23 receives a downlink radio signal including collection region information, a collection instruction signal, or a collection stop signal from the server 4, and outputs the received collection region information, collection instruction signal, or collection stop signal to the data collecting device 3. Further, the wireless communication terminal 23 generates an uplink radio signal including travel history information, probe data, an image, or a sub-image received from the data collecting device 3. The wireless communication terminal 23 transmits the uplink radio signal to the wireless base station 6, thereby transmitting the travel history information or the probe data to the server 4.

Figure 3:
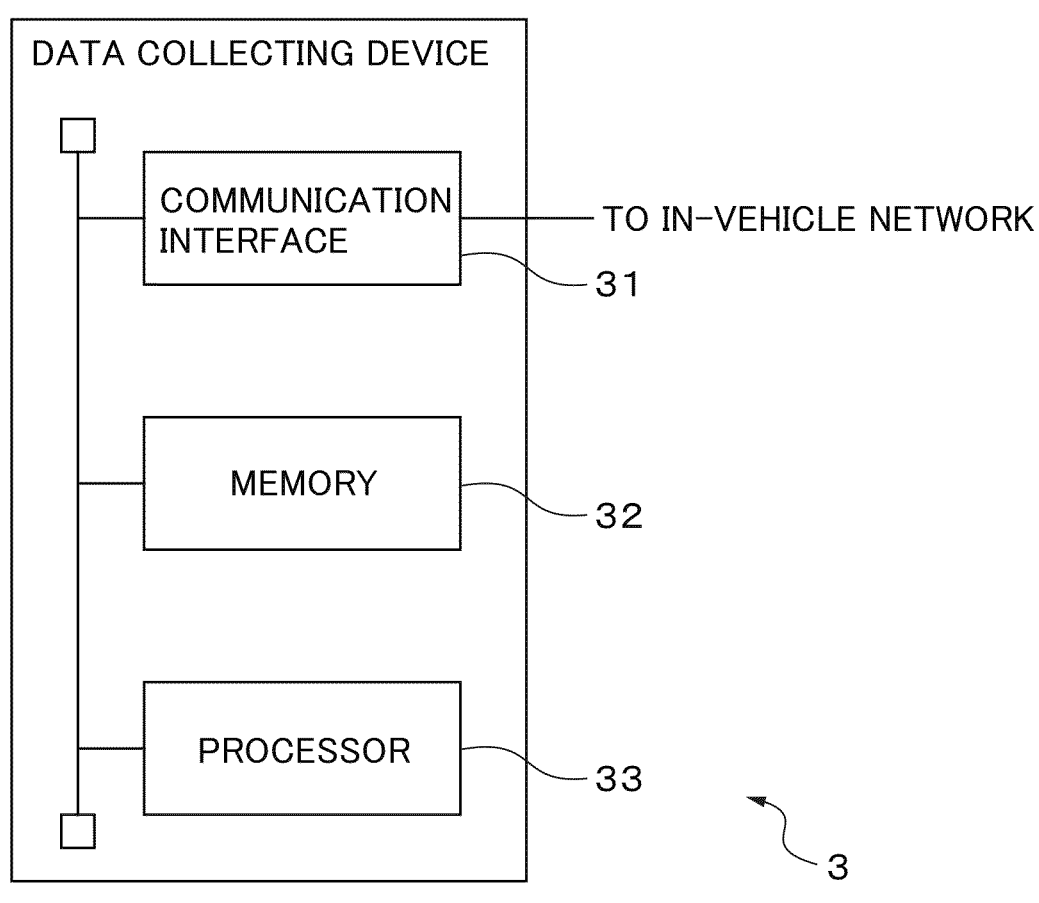
FIG. 3 illustrates the hardware configuration of a data collecting device according to an embodiment.

FIG. 3 illustrates the hardware configuration of the data collecting device 3. The data collecting device 3 generates probe data, based on, for example, an image received from the camera 21, and transmits the generated probe data to the server 4 via the wireless communication terminal 23. In addition, the data collecting device 3 generates travel history information representing the trajectory of the vehicle 2, and transmits the generated travel history information to the server 4 via the wireless communication terminal 23. To achieve this, the data collecting device 3 includes a communication interface 31, a memory 32, and a processor 33.

The communication interface 31, which is an example of an in-vehicle communication unit, includes an interface circuit for connecting the data collecting device 3 to the in-vehicle network. In other words, the communication interface 31 is connected to the camera 21, the GPS receiver 22, and the wireless communication terminal 23 via the in-vehicle network. Every time an image is received from the camera 21, the communication interface 31 passes the received image to the processor 33. Every time positioning information is received from the GPS receiver 22, the communication interface 31 passes the received positioning information to the processor 33. Every time information from the server 4, such as collection region information, is received from the wireless communication terminal 23, the communication interface 31 passes the information to the processor 33. Further, the communication interface 31 outputs data received from the processor 33, such as probe data or travel history information, to the wireless communication terminal 23 via the in-vehicle network.

The memory 32, which is an example of a storage unit, includes, for example, volatile and nonvolatile semiconductor memories. The memory 32 may further include other storage, such as a hard disk drive. The memory 32 stores various types of data used in a process related to data collection executed by the processor 33 of the data collecting device 3. For example, the memory 32 stores identifying information of the vehicle 2, parameters of the camera 21, such as the focal length, the orientation, and the mounted position of the camera 21, various parameters for specifying a classifier for detecting a feature from an image received from the camera 21, and positioning information received from the GPS receiver 22. The memory 32 further stores collection region information, which includes information indicating the position and area of an update target region or an update target section where probe data is to be collected (e.g., coordinates of endpoints of the update target region or the update target section). The memory 32 may further store a computer program for implementing processes executed by the processor 33.

In addition, the memory 32 temporarily stores generated travel history information and probe data.

The processor 33 includes one or more central processing units (CPUs) and a peripheral circuit thereof. The processor 33 may further include another operating circuit, such as a logic-arithmetic unit, an arithmetic unit, or a graphics processing unit. The processor 33 executes a data collecting process during travel of the vehicle 2.

Figure 4:
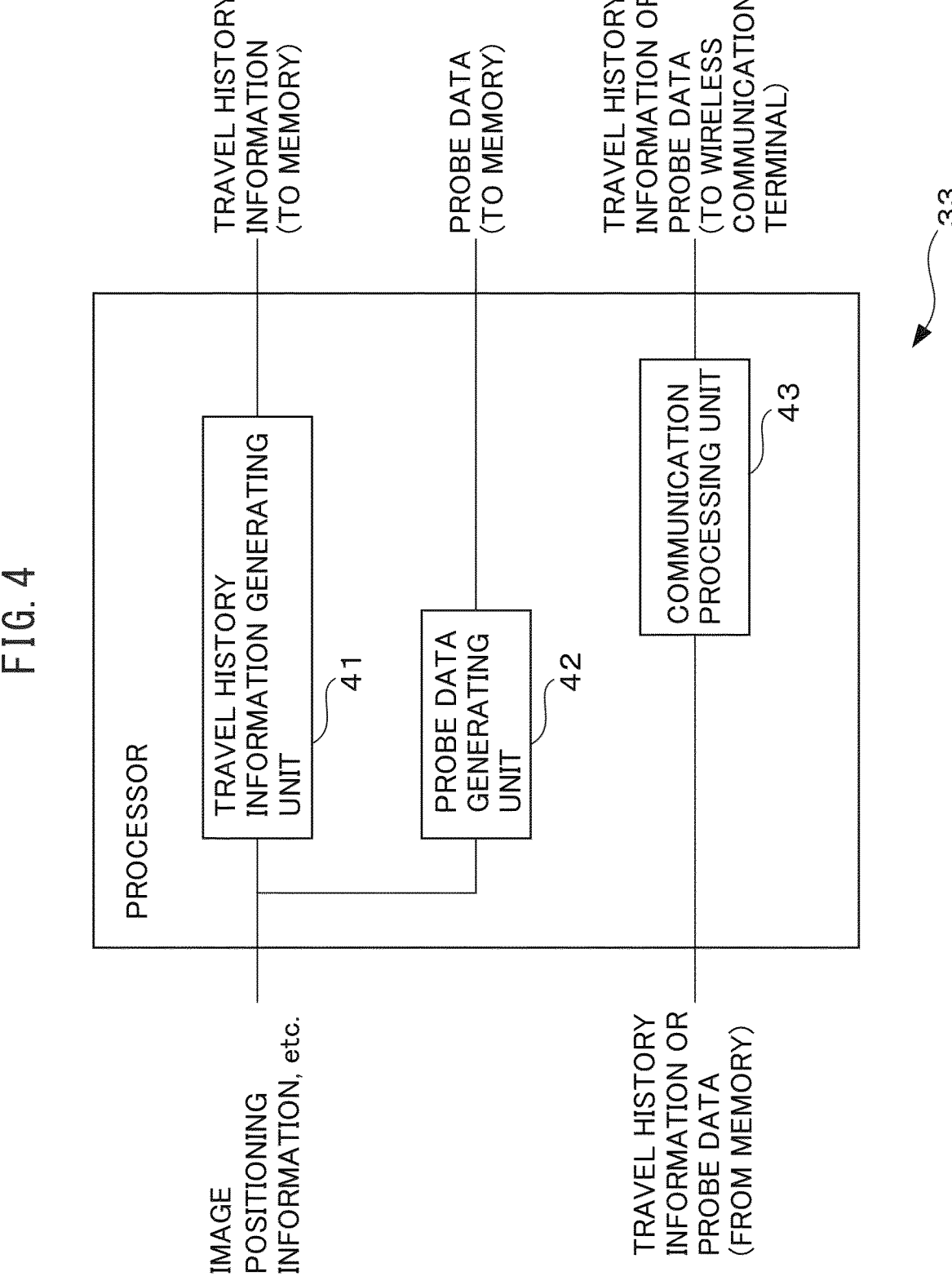
FIG. 4 is a functional block diagram of a processor of the data collecting device.

FIG. 4 is a functional block diagram of the processor 33 of the data collecting device 3. The processor 33 includes a travel history information generating unit 41, a probe data generating unit 42, and a communication processing unit 43. These units included in the processor 33 are functional modules, for example, implemented by a computer program executed by the processor 33, or may be dedicated operating circuits provided in the processor 33.

The travel history information generating unit 41 generates travel history information representing the trajectory of the vehicle 2. More specifically, the travel history information generating unit 41 arranges position coordinates of the vehicle 2 indicated by a series of pieces of positioning information obtained from the GPS receiver 22 between turning on and off of the ignition switch of the vehicle 2 in chronological order to generate travel history information. In addition, the travel history information generating unit 41 associates the travel history information with the position coordinates of the vehicle 2 respectively indicated by the series of pieces of positioning information to include the dates and times of acquisition of the positioning information, i.e., the dates and times when the vehicle 2 passed the locations of the position coordinates. The travel history information generating unit 41 may estimate the positions of the vehicle 2 in a period during which positioning information is not obtained, by referring to the position coordinates of the vehicle 2 before and after the period and odometry information in this period, and include the coordinates of the estimated positions of the vehicle 2 in the period in the travel history information. In the travel history information, the travel history information generating unit 41 further includes the date and time of timing when the ignition switch is turned on, the date and time of timing when the ignition switch is turned off, and identifying information of the vehicle 2. The identifying information of the vehicle 2 included in the travel history information is not limited to identifying information of the vehicle 2 itself, and may be identifying information of the data collecting device 3 or the wireless communication terminal 23 mounted on the vehicle 2.

When the ignition switch of the vehicle 2 is turned off, the travel history information generating unit 41 transmits the travel history information to the server 4 via the wireless communication terminal 23.

The probe data generating unit 42 generates probe data during travel of the vehicle 2 every predetermined period or every time the vehicle 2 travels a predetermined distance.

To achieve this, the probe data generating unit 42 detects a predetermined feature from the latest image generated by the camera 21 during travel of the vehicle 2 every predetermined period or every time the vehicle 2 travels a predetermined distance. The predetermined feature is a feature represented in map information to be updated, and is, for example, one of various road markings or traffic signs, a curbstone, a guardrail, traffic lights, or a pole for installing a traffic sign.

For example, the probe data generating unit 42 inputs the image into a classifier to detect a predetermined feature represented in the inputted image. As such a classifier, the probe data generating unit 42 can use a deep neural network (DNN) having architecture of a convolutional neural network (CNN) type, such as Single Shot MultiBox Detector or Faster R-CNN. Alternatively, as such a classifier, the probe data generating unit 42 may use a DNN having architecture of a self-attention network (SAN) type, such as Vision Transformer, or a classifier based on another machine learning technique, such as an AdaBoost classifier. Such a classifier is trained in advance with a large number of training images representing a predetermined feature that is a detection target in accordance with a predetermined training technique, such as backpropagation, so as to detect the feature from an image. The classifier outputs information indicating a region including a detection target feature in the inputted image, e.g., a circumscribed rectangle of the detection target feature (hereafter an "object region"), and information indicating the type of the feature represented in the object region.

The probe data generating unit 42 estimates the position of a feature represented in an object region detected from an image, based on the direction from the camera 21 to a position corresponding to the centroid of the object region, the position and the travel direction of the vehicle 2 at the time of generation of the image, and parameters of the camera 21, such as the orientation, the focal length, and the mounted position. Specifically, the probe data generating unit 42 may estimate the position of the feature by "structure from motion (SfM)." In this case, the probe data generating unit 42 associates object regions representing the same feature in two images obtained at different timings with each other, using optical flow. The probe data generating unit 42 estimates the position of the feature by triangulation, based on the positions and the travel directions of the vehicle 2 at the times of acquisition of the two images, the parameters of the camera 21, and the positions of the object regions in the respective images. The probe data generating unit 42 generates probe data including information indicating the type and the estimated position of the detected feature. In the probe data, the probe data generating unit 42 may further include information indicating the position and the travel direction of the vehicle 2 at the time of generation of the image, and further include information indicating the size and the position in the image of the object region. The probe data generating unit 42 generates a single piece of probe data for each detected feature. Thus, when multiple features are detected from an image, multiple pieces of probe data are generated from the image.

Every time probe data is generated, the probe data generating unit 42 writes the generated probe data in the memory 32.

The communication processing unit 43 transmits probe data stored in the memory 32, which is generated during travel of the vehicle 2 in an update target region or an update target section indicated by collection region information, to the server 4 via the wireless communication terminal 23.

The communication processing unit 43 determines whether the vehicle 2 has entered an update target region or an update target section, by referring to collection region information and the latest positioning information. When the vehicle 2 enters an update target region or an update target section, the communication processing unit 43 transmits probe data stored in the memory 32 to the server 4 via the wireless communication terminal 23 in chronological order. When notification of a stop of collection of probe data is received from the server 4 via the wireless communication terminal 23, the communication processing unit 43 stops transmitting probe data. Alternatively, the communication processing unit 43 may transmit predetermination data for inquiring whether to transmit probe data, to the server 4 via the wireless communication terminal 23 before starting transmission of probe data. In this case, the communication processing unit 43 may include identifying information of the vehicle 2 as well as positional information of the vehicle 2 indicated by the latest positioning information or information for identifying a region or a road section including the position of the vehicle 2, in the predetermination data. After transmission of the predetermination data, the communication processing unit 43 may start transmitting probe data only when a collection instruction signal of probe data is received from the server 4 via the wireless communication terminal 23.

Further, the communication processing unit 43 deletes probe data transmitted to the server 4 via the wireless communication terminal 23 from the memory 32.

When the vehicle 2 exits an update target region or an update target section, the communication processing unit 43 identifies probe data that has not been transmitted at the time of this exit, by referring to the memory 32. When transmission of the identified probe data to the server 4 is completed, the communication processing unit 43 finishes transmission of probe data. The communication processing unit 43 determines whether the vehicle 2 has exited an update target region or an update target section, by referring to collection region information and the latest positioning information, similarly to determination whether the vehicle 2 has entered an update target region or an update target section.

When instructed, with a collection instruction signal, to collect images of an update target section as well as probe data, the communication processing unit 43 transmits a series of images generated during travel of the vehicle 2 through the update target section, together with probe data, to the server 4 via the wireless communication terminal 23. When instructed to collect sub-images of an update target section, the communication processing unit 43 cuts out a predetermined area from each of a series of images generated during travel of the vehicle 2 through the update target section to generate sub-images. The communication processing unit 43 transmits a series of sub-images thus obtained, together with probe data, to the server 4 via the wireless communication terminal 23.

The following describes the server 4, which is an example of the data collection instruction device. The server 4 selects vehicles that will be instructed to collect probe data of an update target region from among the plurality of vehicles 2, and instructs the selected vehicles to collect probe data of the update target region. The server 4 also instructs the other vehicles to collect probe data of an update target section in the update target region. As described above, an update target region is, for example, a region that may be a target for update of map information, i.e., a region where the presence or absence of a change point is to be determined whereas an update target section is, for example, a road section including a detected change point.

In addition, the server 4 stores probe data transmitted from the data collecting devices 3 mounted on the respective vehicles 2. Based on the probe data, the server 4 detects a change point or updates map information. In addition, the server 4 notifies the individual vehicles 2 of collection region information.

Figure 5:
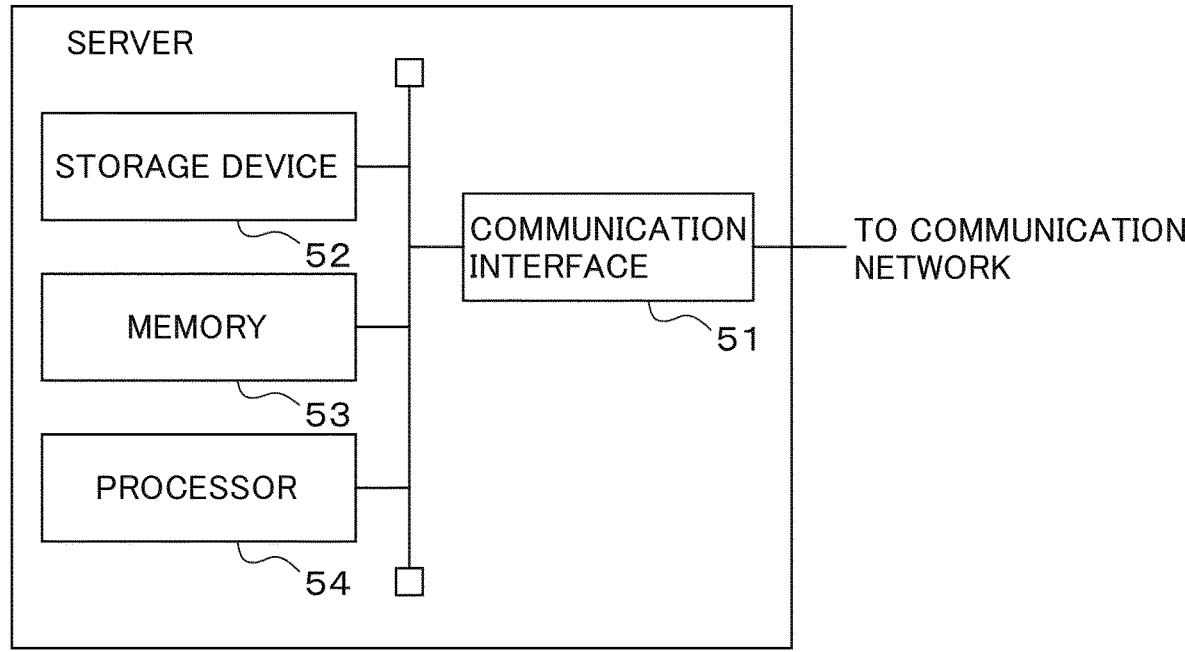
FIG. 5 illustrates the hardware configuration of a server, which is an example of the data collection instruction device.

FIG. 5 illustrates the hardware configuration of the server 4. The server 4 includes a communication interface 51, a storage device 52, a memory 53, and a processor 54. The communication interface 51, the storage device 52, and the memory 53 are connected to the processor 54 via a signal line. The server 4 may further include an input device, such as a keyboard and a mouse, and a display device, such as a liquid crystal display.

The communication interface 51, which is an example of the communication unit, includes an interface circuit for connecting the server 4 to the communication network 5.

The communication interface 51 is configured to be communicable with the data collecting devices 3 mounted on the respective vehicles 2 via the communication network 5 and the wireless base station 6. More specifically, the communication interface 51 passes, to the processor 54, travel history information, probe data, and other data received from the data collecting devices 3 of the respective vehicles 2 via the wireless base station 6 and the communication network 5. The communication interface 51 transmits collection region information, a collection instruction signal, and other signals received from the processor 54 to the data collecting devices 3 of the respective vehicles 2 via the communication network 5 and the wireless base station 6.

The storage device 52, which is an example of the storage unit, includes, for example, a hard disk drive, or an optical medium and an access device therefor, and stores map information to be updated. The storage device 52 also stores information indicating an update target region in an area represented in the map information.

Multiple update target regions may be set. In this case, the boundaries between update target regions are preferably set so that the number of vehicles crossing the boundaries between update target regions among the plurality of vehicles 2 may be as small as possible. For example, update target regions are set so that locations serving as the boundaries of traffic areas, such as mountains or rivers, may be on the boundaries of the update target regions.

For each update target region, the storage device 52 further stores probe data, images, and sub-images collected in individual road sections included in the update target region. The storage device 52 further stores travel history information received from the individual vehicles 2. The storage device 52 may further store a computer program executed by the processor 54 for executing a data collection instruction process.

The memory 53, which is another example of the storage unit, includes, for example, nonvolatile and volatile semiconductor memories. The memory 53 temporarily stores various types of data generated during execution of the data collection instruction process and various types of data obtained by communication with the individual vehicles 2, such as probe data and travel history information.

The processor 54, which is an example of a control unit, includes one or more central processing units (CPUs) and a peripheral circuit thereof. The processor 54 may further include another operating circuit, such as a logic-arithmetic unit or an arithmetic unit. Every time probe data, an image, a sub-image, or travel history information is received from one of the plurality of vehicles 2, the processor 54 stores the received probe data, image, sub-image, or travel history information in the storage device 52. At this time, the processor 54 may count the amount of received probe data for each road section. In this case, every time probe data is received, the processor 54 identifies a road section traveled by the vehicle 2 at the time of generation of the probe data by referring to the position of the vehicle 2 included in the probe data, and increments a count value of probe data of the identified road section by one. In addition, the processor 54 executes the data collection instruction process.

Figure 6:
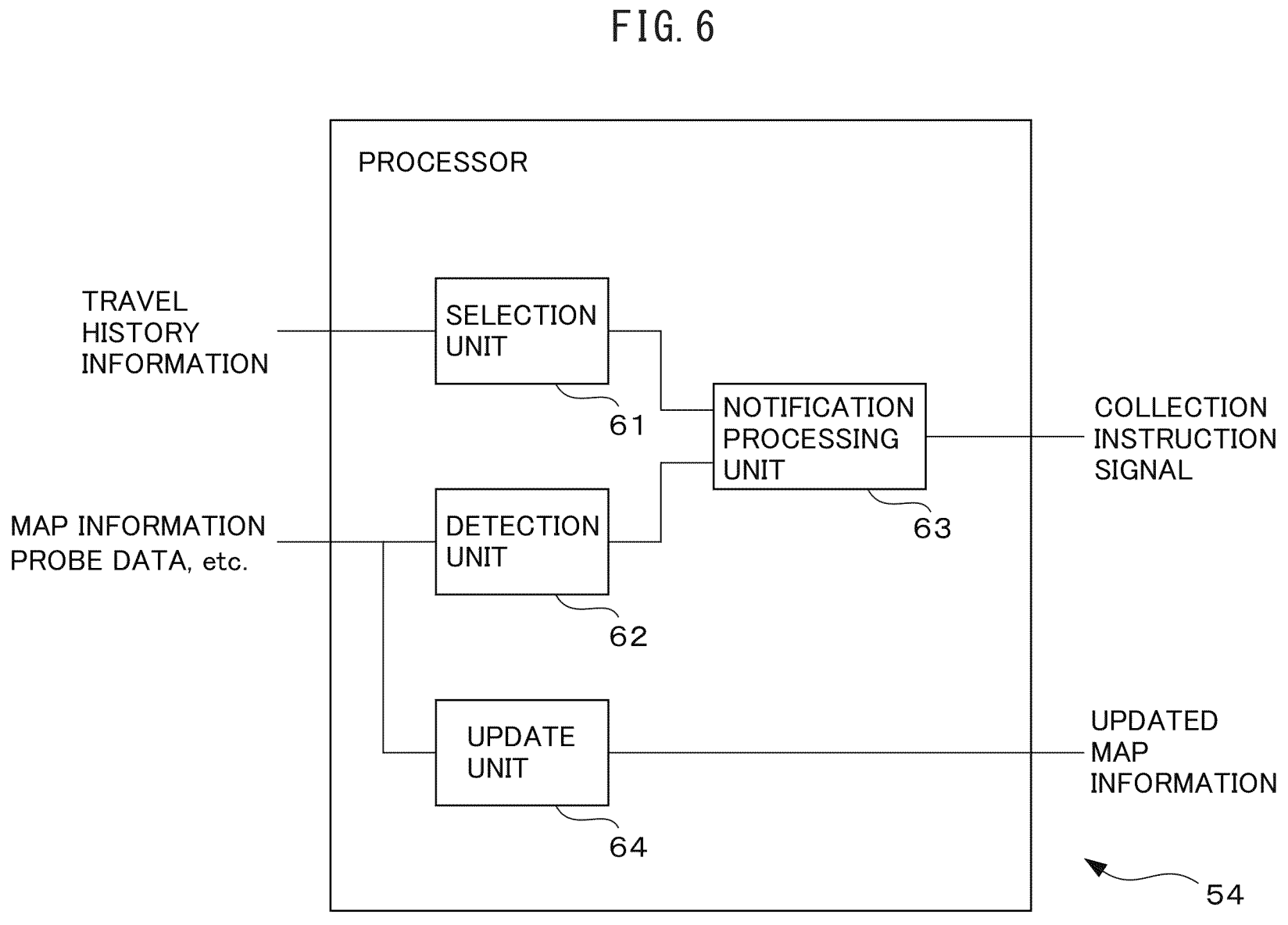

FIG. 6 is a functional block diagram of the processor 54 of the server 4. The processor 54 includes a selection unit 61, a detection unit 62, a notification processing unit 63, and an update unit 64. These units included in the processor 54 are functional modules, for example, implemented by a computer program executed by the processor 54, or may be dedicated operating circuits provided in the processor 54.

At predetermined timing, the selection unit 61 selects one or more vehicles satisfying a predetermined condition related to travel in an update target region from among the plurality of vehicles 2 by referring to travel history information received from each of the plurality of vehicles 2. The predetermined timing, which is set in advance, may be, for example, a predetermined date and time in each month or a predetermined time on a predetermined day of the week.

When multiple update target regions are set, the selection unit 61 executes the following processing for each update target region. Thus the following describes processing for a single update target region.

In the present embodiment, for each of the plurality of vehicles 2, the selection unit 61 calculates travel coverage that is the ratio of road sections actually traveled in a most recent predetermined period (e.g., one week to one month) to a plurality of road sections included in the update target region, by referring to travel history information of the vehicle 2. The selection unit 61 selects one or more vehicles from among the plurality of vehicles 2 in descending order of travel coverage as vehicles that will be instructed to collect probe data used for determining the presence or absence of a change point. In this way, the selection unit 61 can select vehicles appropriately so that probe data can be collected from the whole update target region with a relatively small number of vehicles.

The selection unit 61 selects position coordinates associated with dates and times included in the most recent predetermined period from the position coordinates of an individual vehicle 2 included in the travel history information. For each selected position coordinate, the selection unit 61 compares the position coordinate with the positions and areas of the respective road sections included in the update target region represented in map information to identify a road section including the position coordinate. The selection unit 61 determines the identified road section as a road section traveled by the vehicle 2. In this way, the selection unit 61 identifies individual road sections traveled by the vehicle 2 in the most recent predetermined period among the road sections included in the update target region, thereby calculating the travel coverage.

The selection unit 61 counts the same road section only once even if the vehicle 2 traveled the road section multiple times in the most recent predetermined period. The selection unit 61 may calculate the travel coverage, taking account of the lengths of individual road sections. In this case, the selection unit 61 calculates the ratio of the sum of the lengths of road sections traveled by the vehicle 2 to the sum of the lengths of the individual road sections included in the update target region, as the travel coverage. In addition, an importance level may be preset for each road section. For example, the highest importance level may be set for a road section of an expressway; the second highest importance level for a road section of a national road; and the lowest importance level for the other road sections. In this case, the selection unit 61 calculates the ratio of the sum of the importance levels of road sections actually traveled by the vehicle 2 in the most recent predetermined period to the sum of the importance levels of the plurality of road sections included in the update target region, as the travel coverage. This calculation of the travel coverage based on the importance levels results in a vehicle that travels through a road section of a high importance level more frequently being more likely to be selected from among the plurality of vehicles 2.

The selection unit 61 selects the vehicles 2 in descending order of travel coverage until road sections traveled by the selected vehicles 2 account for at least a predetermined percentage (e.g., 80% to 90%) of road sections in the update target region. When there is a road section not yet traveled by any of the selected vehicles 2, the selection unit 61 may additionally select a vehicle 2 that traveled through the road section.

Alternatively, the selection unit 61 may select a preset number of vehicles 2 in descending order of travel coverage. In this case also, when there is a road section not yet traveled by any of the selected vehicles 2, the selection unit 61 may additionally select a vehicle 2 that traveled through the road section.

According to a modified example, for each of the plurality of vehicles 2, the selection unit 61 may calculate a specific time ratio that is the ratio of time of travel in the update target region in a predetermined time of day or a predetermined day of the week to total travel time in a most recent predetermined period, by referring to the travel history of the vehicle 2. The selection unit 61 may then select one or more vehicles from among the plurality of vehicles 2 in descending order of the specific time ratio. This enables the selection unit 61 to select a vehicle 2 that is likely to travel in the update target region in the predetermined time of day or the predetermined day of the week. The predetermined time of day or the predetermined day of the week may be a time of day or a day of the week when images generated by the camera 21 are expected to represent a detection target feature clearly, e.g., a time of day when a feature on a particular lane is not covered by a parked vehicle or another object, such as early morning. Thus the selection unit 61 can select a vehicle 2 that is likely to pass the update target region at timing suitable for collecting probe data, to collect probe data for detecting a change point.

In this case, the selection unit 61 determines the sum of individual periods between timings of turning on and off of the ignition switch in the most recent predetermined period as the total travel time, by referring to the dates and times of turning on and off of the ignition switch, which are included in the travel history information. Further, the selection unit 61 selects position coordinates associated with dates and times that are included in the predetermined time of day or that correspond to the predetermined day of the week, from individual position coordinates included in the travel history information. From the selected position coordinates, the selection unit 61 further selects position coordinates included in the update target region. Based on the dates and times associated with the individual position coordinates selected in the end, the selection unit 61 calculates the sum of periods between entry of the vehicle 2 into the update target region and an exit therefrom, as the time of travel of the vehicle 2 in the update target region in the predetermined time of day or the predetermined day of the week.

The selection unit 61 identifies identifying information of the selected one or more vehicles by referring to travel history information of each selected vehicle, and notifies the notification processing unit 63 of the identifying information of the selected vehicles.

The detection unit 62 determines the presence or absence of a change point for each road section in the update target region, based on probe data collected from the one or more vehicles 2 selected by the selection unit 61. The detection unit 62 detects a road section including a change point among the road sections in the update target region.

After the elapse of a predetermined period from notification of an instruction to collect probe data to the selected one or more vehicles 2, the detection unit 62 reads probe data collected for the update target region from the storage device 52. For each vehicle 2, the detection unit 62 executes registration between individual features represented by a series of probe data generated during travel of the vehicle 2 in the update target region and corresponding features represented in map information to be updated. To this end, the detection unit 62 calculates coefficients of affine transformation in accordance with a predetermined optimization method, such as the steepest-descent method, so as to minimize the sum of squares of the distances between the positions of the individual features represented by the series of probe data and the corresponding features represented in the map information. The detection unit 62 moves the positions of the individual features represented by the series of probe data, using the calculated coefficients of affine transformation, to execute registration between these features and the corresponding features represented in the map information.

When the above-described registration is finished, the detection unit 62 detects a location where a feature represented by the collected probe data does not match a corresponding feature represented in the map information, as a change point, for each vehicle 2 and each road section included in the update target region. For example, when there are features of the same type separated by at most a predetermined distance and represented by each of a predetermined amount of collected probe data in some road section, the detection unit 62 determines that the features represented by these pieces of probe data are the same feature. When no corresponding feature is represented in the map information within the predetermined distance of the same feature represented by these pieces of probe data, a new feature may be provided after the last update of the map information. Thus the detection unit 62 detects an average position of the positions of the feature represented by the predetermined amount of probe data as a change point.

When probe data representing a corresponding feature within the predetermined distance of the position of a predetermined feature represented in the map information is not collected, the feature represented in the map information may be removed. Thus the detection unit 62 detects the position of the feature represented in the map information as a change point. When the distance between a predetermined feature represented in the map information and a corresponding feature represented by probe data of the same type as the predetermined feature is greater than the predetermined distance, the predetermined feature may be moved after the last update of the map information. Thus the detection unit 62 may detect both the position of the predetermined feature represented in the map information and the position of the corresponding feature represented by probe data as change points.

When the type of a predetermined feature represented in the map information differs from that of a corresponding feature represented by probe data within the predetermined distance of the position of the former feature, the type of the predetermined feature may be changed after the last update of the map information. In this case also, the detection unit 62 may detect the position of the predetermined feature represented in the map information as a change point.

For each detected change point, the detection unit 62 identifies a road section including the position coordinates of the change point as an update target section, by referring to the map information, and notifies the notification processing unit 63 of information indicating the update target section including the change point.

The detection unit 62 may also set a road section where the amount of collected probe data has not reached a prescribed amount even after the elapse of the predetermined period from notification of an instruction to collect probe data of the update target region, as an update target section. The detection unit 62 may then notify the notification processing unit 63 of information indicating the update target section where the amount of collected probe data has not reached a prescribed amount.

The notification processing unit 63 instructs each of the one or more vehicles 2 selected by the selection unit 61 from the plurality of vehicles 2 to collect probe data of the update target region. To achieve this, the notification processing unit 63 identifies the selected one or more vehicles 2, based on identifying information received from the selection unit 61. The notification processing unit 63 generates collection region information indicating that the whole update target region is a collect target region of probe data, and notifies the generated collection region information to each of the identified vehicles 2 via the communication interface 51. In addition, the notification processing unit 63 generates a collection instruction signal indicating an instruction to collect probe data, and notifies the generated collection instruction signal to each of the identified vehicles 2 via the communication interface 51. When the server 4 receives predetermination data, the notification processing unit 63 may determine whether to give instructions to collect probe data, based on the predetermination data. For example, when the amount of collected probe data has reached a prescribed amount in a road section including the position of a vehicle 2 indicated by predetermination data, the notification processing unit 63 may determine not to give instructions to collect probe data in the road section. When the amount of collected probe data has not reached the prescribed amount, the notification processing unit 63 may determine to give instructions to collect probe data. In this case, the notification processing unit 63 notifies a collection instruction signal via the communication interface 51 to the vehicle 2 that has transmitted the predetermination data. When multiple update target regions are set, vehicles are selected for each update target region. Thus the notification processing unit 63 may give instructions to collect probe data of different update target regions, depending on vehicles.

After the elapse of the predetermined period from notification of collection region information to each of the selected one or more vehicles 2, the notification processing unit 63 may further notify a collection stop signal to stop collecting probe data to each of the selected one or more vehicles 2 via the communication interface 51.

When information indicating an update target section is received from the detection unit 62, the notification processing unit 63 generates collection region information indicating that the update target section is a collect target region of probe data. The notification processing unit 63 notifies the generated collection region information to each of the plurality of vehicles 2 except the selected one or more vehicles via the communication interface 51. In addition, the notification processing unit 63 generates a collection instruction signal indicating an instruction to collect probe data of the update target section, and notifies the generated collection instruction signal to each of the plurality of vehicles 2 except the selected one or more vehicles via the communication interface 51. The notification processing unit 63 may give instructions to collect images themselves or sub-images as well as probe data, with the collection instruction signal for the update target section. When the server 4 has received predetermination data, the notification processing unit 63 may also give instructions to collect probe data of the update target section only if the amount of collected probe data has not reached the prescribed amount.

The notification processing unit 63 may also notify a collection instruction signal for the update target section via the communication interface 51 to each vehicle selected by the selection unit 61 from the plurality of vehicles 2.

Figure 7:
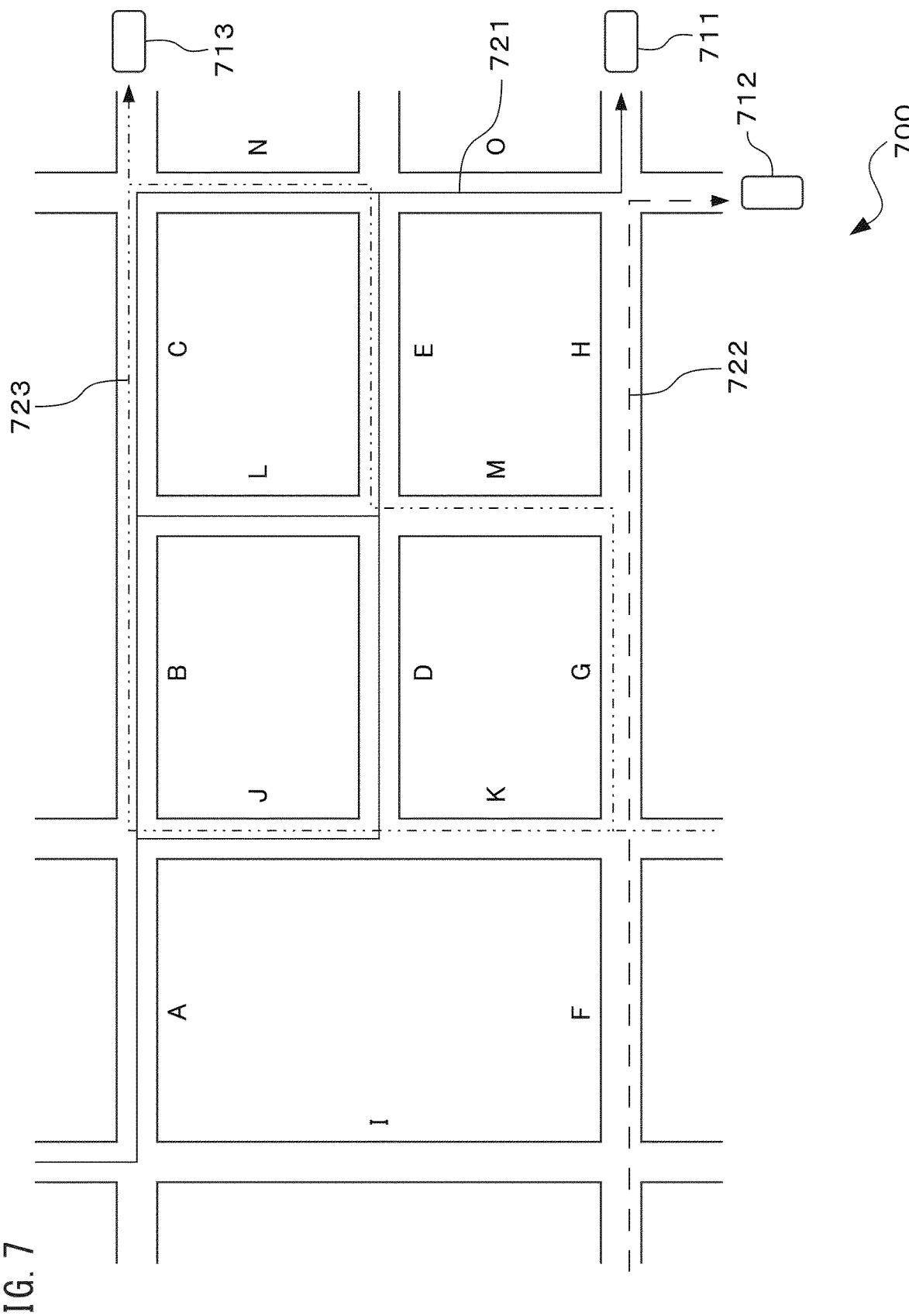
FIG. 7 is an explanatory diagram illustrating an example of collection instructions to vehicles.

FIG. 7 is an explanatory diagram illustrating an example of collection instructions to vehicles. In this example, an update target region 700 includes fifteen road sections {A, B, C, . . . , O}. A vehicle 711 has traveled through nine road sections, as illustrated by a trajectory 721 in a most recent predetermined period (the trajectory is not necessarily made by traveling once, and may be made by traveling multiple times; the same applies below) indicated by travel history information of the vehicle 711. In other words, the travel coverage of the vehicle 711 is 60%. In contrast, a vehicle 712 has traveled through three road sections, as illustrated by a trajectory 722 in the most recent predetermined period indicated by travel history information of the vehicle 712. In other words, the travel coverage of the vehicle 712 is 20%. In addition, a vehicle 713 has traveled through eight road sections, as illustrated by a trajectory 723 in the most recent predetermined period indicated by travel history information of the vehicle 713. In other words, the travel coverage of the vehicle 713 is 53%. Assume that vehicles whose travel coverage is not less than 50% are selected. Thus the vehicles 711 and 713 are selected and notified of a collection instruction signal of probe data for detecting a change point. On the other hand, the vehicle 712 is not selected or notified of a collection instruction signal of probe data for detecting a change point. However, after detection of a change point, the vehicle 712 will be notified of a collection instruction signal for an update target section including the change point. For example, when a change point is detected in road section G, the vehicle 712 will be notified of a collection instruction signal indicating an instruction to collect probe data of road section G.

The update unit 64 updates information on a predetermined feature in an update target section represented in map information, based on probe data collected for the update target section. To achieve this, for each vehicle 2 that has traveled through the update target section, the update unit 64 executes registration between individual features represented by a series of probe data received from the vehicle 2 and corresponding features represented in the map information. To this end, the update unit 64 executes processing similar to that of registration by the detection unit 62. When features represented by probe data received from at least a predetermined number of vehicles 2 and assumed to be the same do not have a corresponding feature in the map information, the update unit 64 adds the type and position of these features to the map information. Conversely, when probe data representing a corresponding feature within the predetermined distance of a feature represented in the map information is not collected, the update unit 64 deletes information on the latter feature from the map information. Assume that the distance between a predetermined feature represented in the map information and that feature of the same type as the predetermined feature which is represented by at least a predetermined amount of received probe data is greater than the predetermined distance. In this case, the update unit 64 corrects the position of the feature represented in the map information to an average of the positions of the feature represented by at least a predetermined amount of received probe data.

When a feature can be detected from an image or a sub-image received from a vehicle that travels through an update target section, the update unit 64 may add information on the detected feature to the map information. In this case, the update unit 64 detects a feature by inputting an image or a sub-image into a classifier similar to that used by the probe data generating unit 42 of the data collecting device 3. Further, the update unit 64 estimates the position of the detected feature, based on the position and the travel direction of the vehicle 2 at the time of generation of the image, the parameters of the camera 21, and the position of the feature in the image or the sub-image.

The update unit 64 stores the updated map information in the storage device 52. The notification processing unit 63 may further output the updated map information to another device via the communication interface 51 and the communication network 5. Further, the notification processing unit 63 may deliver the updated map information to some of the plurality of vehicles 2 or another vehicle that uses the map information for autonomous driving control, via the communication interface 51, the communication network 5, and the wireless base station 6.

Figure 8:
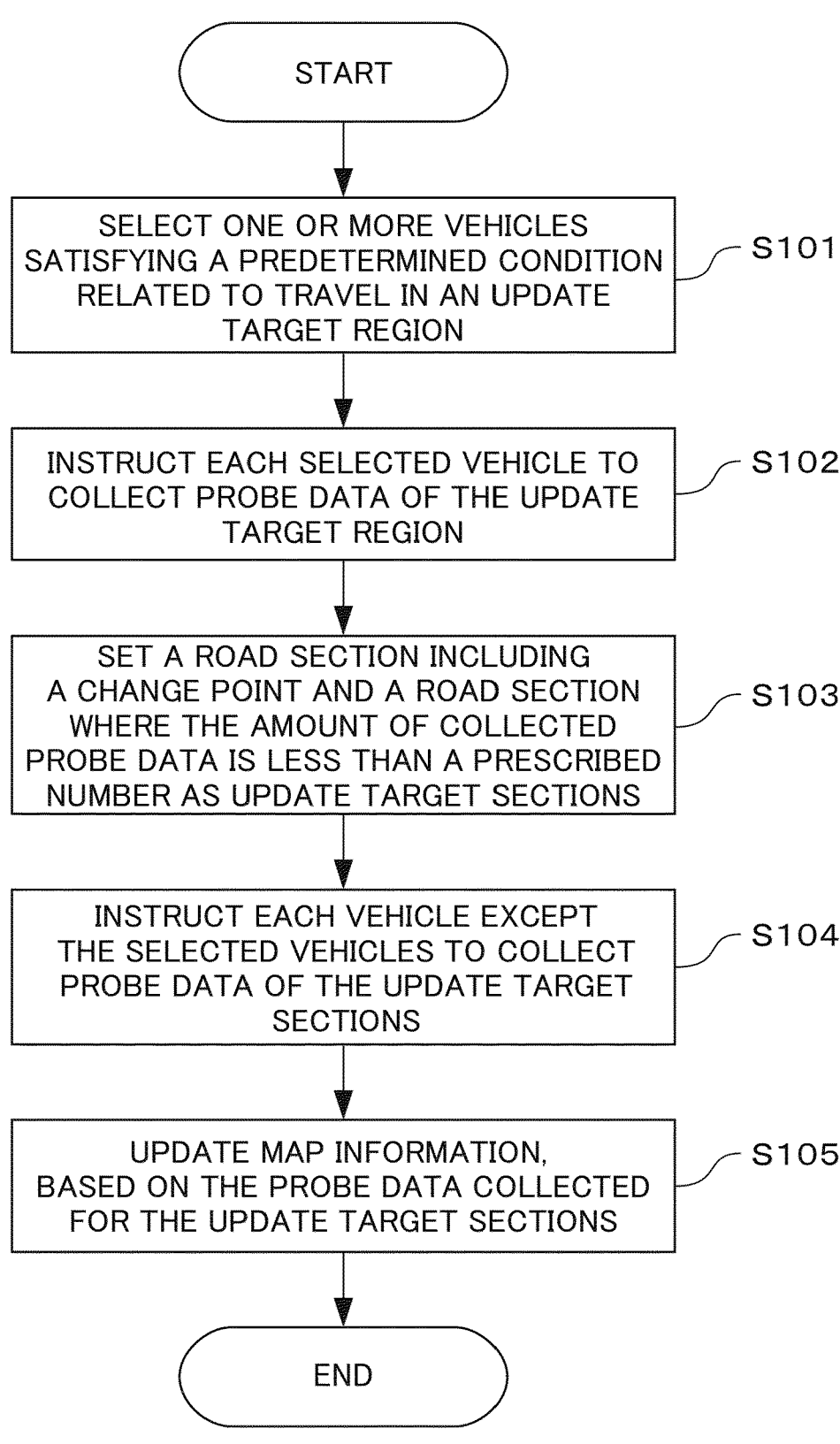
FIG. 8 is an operation flowchart of a data collection instruction process.

FIG. 8 is an operation flowchart of the data collection instruction process. The processor 54 of the server 4 executes the data collection instruction process in accordance with the operation flowchart described below.

The selection unit 61 of the processor 54 selects one or more vehicles satisfying a predetermined condition related to travel in an update target region from among the plurality of vehicles 2 (step S101). The notification processing unit 63 of the processor 54 notifies the selected one or more vehicles of collection region information indicating that the update target region is a collection target region and a collection instruction signal indicating an instruction to collect probe data of the update target region, via the communication interface 51 (step S102).

After the elapse of a predetermined period from notification of the collection instructions, the detection unit 62 of the processor 54 identifies a road section including a change point and a road section where the amount of collected probe data is less than a prescribed amount as update target sections among the road sections in the update target region, based on the collected probe data (step S103).

The notification processing unit 63 notifies the plurality of vehicles 2 except the selected one or more vehicles of collection region information indicating that the update target sections are a collection target region and a collection instruction signal indicating an instruction to collect probe data of the update target sections, via the communication interface 51 (step S104). As described above, the notification processing unit 63 may also instruct the one or more vehicles selected in step S101 to collect probe data of the update target sections.

The update unit 64 of the processor 54 updates map information, based on the probe data collected for the update target sections (step S105). The processor 54 then terminates the data collection instruction process.

As has been described above, the data collection instruction device selects one or more vehicles satisfying a predetermined condition related to travel in an update target region from among a plurality of vehicles that can generate and collect probe data, and instructs the selected one or more vehicles to collect probe data of the update target region. Further, the data collection instruction device instructs the plurality of vehicles except the selected one or more vehicles to collect probe data of an update target section in the update target region, such as a road section including a change point. In this way, probe data of road sections in the update target region is collected by the selected vehicles, which reduces communication traffic required to transmit probe data. In addition, the selected vehicles generate probe data over a continuous section of a certain length, which enables collecting an amount of probe data necessary for detecting a change point while ensuring the accuracy of registration. In addition, the data collection instruction device also instructs other vehicles except the selected vehicles to collect probe data of the update target section, enabling collection of an amount of probe data necessary for updating information on a change point.

As described above, those skilled in the art may make various modifications according to embodiments within the scope of the present invention.

What is claimed is:

1. A data collection instruction device comprising:
a memory configured to store travel history of each of a plurality of vehicles; and
a processor configured to:
select one or more vehicles satisfying a predetermined condition related to travel in an update target region of map information from among the plurality of vehicles, based on the travel history of each of the plurality of vehicles,
instruct the selected one or more vehicles to collect probe data representing a predetermined feature of the update target region, via a communication device, and
instruct the plurality of vehicles except the selected one or more vehicles to collect the probe data of a predetermined road section, via the communication device;
wherein the processor selects one or more vehicles from among the plurality of vehicles in descending order of travel coverage that is the ratio of road sections actually traveled in a most recent predetermined period to a plurality of road sections included in the update target region, by referring to the travel history of each of the plurality of vehicles;
wherein an importance level is set for each of the plurality of road sections included in the update target region, and
for each of the plurality of vehicles, the processor calculates the ratio of the sum of the importance levels of road sections actually traveled by the vehicle in the most recent predetermined period among the plurality of road sections to the sum of the importance levels of the plurality of road sections, as the travel coverage of the vehicle.

2. A method for giving instructions to collect data, comprising:
selecting one or more vehicles satisfying a predetermined condition related to travel in an update target region of map information from among a plurality of vehicles, based on travel history of each of the plurality of vehicles stored in a memory;
instructing the selected one or more vehicles to collect probe data representing a predetermined feature of the update target region, via a communication device; and
instructing the plurality of vehicles except the selected one or more vehicles to collect probe data of a predetermined road section, via the communication device;
wherein the selecting step comprises selecting one or more vehicles from among the plurality of vehicles in descending order of travel coverage that is the ratio of road sections actually traveled in a most recent predetermined period to a plurality of road sections included in the update target region, by referring to the travel history of each of the plurality of vehicles;

wherein the method comprises setting an importance level for each of the plurality of road sections included in the update target region, and for each of the plurality of vehicles, calculating the ratio of the sum of the importance levels of road sections actually traveled by the vehicle in the most recent predetermined period among the plurality of road sections to the sum of the importance levels of the plurality of road sections, as the travel coverage of the vehicle.

3. A non-transitory recording medium that stores a computer program for giving instructions to collect data, the computer program causing a computer to execute a process comprising:

selecting one or more vehicles satisfying a predetermined condition related to travel in an update target region of map information from among a plurality of vehicles, based on travel history of each of the plurality of vehicles stored in a memory;

instructing the selected one or more vehicles to collect probe data representing a predetermined feature of the update target region, via a communication device; and instructing the plurality of vehicles except the selected one or more vehicles to collect probe data of a predetermined road section, via the communication device;

wherein the selecting step comprises selecting one or more vehicles from among the plurality of vehicles in descending order of travel coverage that is the ratio of road sections actually traveled in a most recent predetermined period to a plurality of road sections included in the update target region, by referring to the travel history of each of the plurality of vehicles;

wherein the computer program causes the computer to execute a process further comprising setting an importance level for each of the plurality of road sections included in the update target region, and for each of the plurality of vehicles, calculating the ratio of the sum of the importance levels of road sections actually traveled by the vehicle in the most recent predetermined period among the plurality of road sections to the sum of the importance levels of the plurality of road sections, as the travel coverage of the vehicle.

4. A data collection instruction device comprising:

a memory configured to store travel history of each of a plurality of vehicles; and a processor configured to:

select one or more vehicles satisfying a predetermined condition related to travel in an update target region of map information from among the plurality of vehicles, based on the travel history of each of the plurality of vehicles, instruct the selected one or more vehicles to collect probe data representing a predetermined feature of the update target region, via a communication device, and instruct the plurality of vehicles except the selected one or more vehicles to collect the probe data of a predetermined road section, via the communication device;

wherein the processor selects one or more vehicles from among the plurality of vehicles in descending order of the ratio of time of travel in the update target region in a predetermined time of day or a predetermined day of the week to total travel time in a most recent predetermined period, by referring to the travel history of each of the plurality of vehicles.

5. A method for giving instructions to collect data, comprising:

selecting one or more vehicles satisfying a predetermined condition related to travel in an update target region of map information from among a plurality of vehicles, based on travel history of each of the plurality of vehicles stored in a memory;

instructing the selected one or more vehicles to collect probe data representing a predetermined feature of the update target region, via a communication device; and instructing the plurality of vehicles except the selected one or more vehicles to collect probe data of a predetermined road section, via the communication device;

wherein the selecting step comprises selecting one or more vehicles from among the plurality of vehicles in descending order of the ratio of time of travel in the update target region in a predetermined time of day or a predetermined day of the week to total travel time in a most recent predetermined period, by referring to the travel history of each of the plurality of vehicles.

6. A non-transitory recording medium that stores a computer program for giving instructions to collect data, the computer program causing a computer to execute a process comprising:

selecting one or more vehicles satisfying a predetermined condition related to travel in an update target region of map information from among a plurality of vehicles, based on travel history of each of the plurality of vehicles stored in a memory;

instructing the selected one or more vehicles to collect probe data representing a predetermined feature of the update target region, via a communication device; and instructing the plurality of vehicles except the selected one or more vehicles to collect probe data of a predetermined road section, via the communication device;

wherein the selecting comprises selecting one or more vehicles from among the plurality of vehicles in descending order of the ratio of time of travel in the update target region in a predetermined time of day or a predetermined day of the week to total travel time in a most recent predetermined period, by referring to the travel history of each of the plurality of vehicles.

* * * * *